May 3, 1966 J. O. BURNS ETAL 3,249,677

PICK-UPS FOR GUITARS AND COUPLING CIRCUITS THEREFOR

Filed Oct. 19, 1962 4 Sheets-Sheet 1

INVENTORS:
JAMES O. BURNS
GORDON S. CHANDLER
BY
Browne, Schuyler & Beveridge
ATTORNEYS INVENTORS:
JAMES O. BURNS
GORDON S. CHANDLER
BY Browne, Schuyler & Beveridge
ATTORNEYS May 3, 1966 J. O. BURNS ETAL 3,249,677

PICK-UPS FOR GUITARS AND COUPLING CIRCUITS THEREFOR

Filed Oct. 19, 1962 4 Sheets-Sheet 3

INVENTORS
JAMES O. BURNS
GORDON S. CHANDLER
BY
Browne, Schuyler & Beveridge
ATTORNEYS

PICK-UPS FOR GUITARS AND COUPLING CIRCUITS THEREFOR

Filed Oct. 19, 1962 4 Sheets-Sheet 4

INVENTORS:
JAMES O. BURNS
GORDON S. CHANDLER
BY
Browne, Schuyler & Beveridge
ATTORNEYS United States Patent Office 3,249,677

Patented May 3, 1966

3,249,677
PICK-UPS FOR GUITARS AND COUPLING CIRCUITS THEREFOR

James Ormston Burns, Buckhurst Hill, England, and Gordon Spencer Chandler, Frimley, near Aldershot, England, assignors to Ormston Burns Limited, London, England Filed Oct. 19, 1962, Ser. No. 231,697
Claims priority, application Great Britain, Oct. 20, 1961, 37,732/61
27 Claims. (Cl. 84—1.16)

The present invention relates to pick-ups for guitars and is also concerned with coupling circuits therefor.

It is well known to provide a pick-up on a guitar for deriving electrical signals from the vibrations of steel strings and to feed signals from such pick-up to an amplifier and loud speaker system for production of audible sounds. Conventional pick-ups used hitherto have embodied a magnetic system and one or two coils of relatively high impedance wound around part of the magnetic system, each coil being disposed around part of a magnetic system associated with more than one string when the pick-up is in situ on a guitar. A disadvantage of a pick-up with a high impedance coil is a strong tendency to provide a peak output signal with the first wave when a string is struck or plucked. Moreover there is a risk of stray circuit capacitances and a high impedance coil producing a tuned circuit having a resonant frequency within the audible range with resultant peaking around certain frequencies in the audible range.

According to one feature of the present invention a pick-up for a guitar comprises a permanent magnet core system including at least one pole piece and at least one low impedance coil around and individual to said pole piece.

According to another feature of the present invention a pick-up for a guitar comprises a magnetic core structure including at least one permanent magnet and, for each string from the vibration of which signals are desired to be derived, a core member individual thereto, each core member having low impedance coil therearound.

Preferably a pick-up comprises a base plate of magnetic material having a plurality of core members of magnetic material upstanding therefrom and an individual coil having a D.C. resistance not greater than about 1 ohm therearound, and at least one permanent magnet upstanding from the base plate with its magnetic axis generally parallel to the axis of the core members.

Preferably the height of each core member above the base plate is adjustable and this may conveniently be obtained by providing core members of circular cross section and threading one end thereof and drilling and tapping the base plate to receive the cores. Preferably each coil is wound on a bobbin which is attached or secured to the base plate to enable it to be retained thereon when the core with which it is associated is rotated. By enabling the height of each of the cores to be adjusted it is possible to adjust the spacing between the outer end of each core and the string with which it is associated when the pick-up is installed in a guitar, in order that a desired strength of signal can be obtained in respect of each string.

Preferably the magnetic system includes two permanent magnets each upstanding from the base plate, one on either side of the cores and coils, with their magnetic axes substantially parallel to one another and in the same sense.

The number of cores and coils is preferably equal to the number of strings in the guitar with which it is to be used and thus a pick-up for a conventional electric guitar includes six cores and coils, whilst one intended for use with a base guitar, which conventionally is provided with four strings, has four pole pieces and coils. Whilst the coils in a pick-up could be connected in parallel with one another, with or without a conventional de-coupling arrangement and the attendant loss in signal strength, it is more convenient to connect the coils in series with one another between a pair of common output leads which may then be extended through a coupling transformer to an input circuit of an amplifier and loud speaker system. If desired, switching means may be provided for short-circuiting one or more coils in a pick-up if it should be desired only to derive signals from the vibration of selected strings in the guitar.

Whilst satisfactory audible sounds can be produced from the amplifier and loud speaker system by connecting the pick-up to the input circuit of the amplifier through a conventional matching transformer having a turns ratio suitable for matching the impedance of the pick-up coils to the input impedance of the amplifier, variations in frequency response can be obtained by altering the circuit constants of the coupling circuit between pick-up and amplifier, and it has been found that an effective tone control system can be provided by means of a plurality of transformers of differing turns ratio and/or of differing impedance characteristics and preferably of substantially the same phyhical size. Thus by providing a single pick-up, a plurality of coupling transformers of differing turns ratio and a switching network between the pick-up and an amplifier and loud speaker system, widely differing tonal qualities of sound can be reproduced from a single guitar by selectively placing any one or combination of the transformers in circuit.

In a guitar the harmonic content of the vibration of a string varies along the string, the vibrations being stronger in fundamental frequency in the end region of the finger board and stronger in higher harmonics adjacent the bridge. Furthermore by selectively positioning the pick-up on a guitar between the end of the finger board thereof and the bridge thereof, additional variations in tonal quality may be obtained. By providing two pick-ups, one adjacent the end of the finger board and one adjacent the bridge, different qualities of signal can be derived from each of the strings. Output signals from the two pick-ups can be fed through a switching circuit and one or more of a common plurality of coupling transformers of differing turns ratios to a common amplifier and loud speaker system, whereby an increased range of tonal qualities can be obtained. Moreover a stereophonic effect can be obtained by feeding signals from different transformers or groups of transformers to different amplifier and loud speaker systems. This effect can be further enhanced by short-circuiting one or more coils in one pick-up and other coils in the other pick-up and deriving signals from one or more of the transformers for one amplifier and loud-speaker system, whilst signals from one or more of the remaining transformers are fed to a second amplifier and loud-speaker system.

If desired a plurality of pick-ups may be provided between the bridge and the end of the finger board on a guitar, the number of such pick-up units being effectively determined solely by the available space between the bridge and the end of the finger board. In a conventional guitar as presently constructed, four pick-ups may conveniently be used in conjunction with a common switching network and a plurality of common coupling transformers feeding to two or more amplifier and loud speaker systems, together with means for selectively short-circuiting selected coils or groups of coils in each pick-up, to enable a very wide range of differing tonal qualities of sounds to be produced from a single guitar. Whilst the number of combinations of pick-ups, coils, coupling transformers and amplifiers is very considerable, since signals from any one pick-up can be applied to any transformer or group of transformers, and since the signals applied to each amplifier and loudspeaker means may similarly be derived from any transformers or group of transformers, it is convenient to choose a selected group of combinations and to make each of them available, selectively as required, by switching means in the form of a push-button multi-pole switching assembly.

Where only a single pick-up is provided on a guitar, the coils on the pick-up may be divided into two groups of coils connected in series with one another and switching means can be provided for selectively connecting the two groups in series with one another between a pair of common output leads or for connecting the two groups each to a pair of output leads individual thereto. Additional switching network can be provided in association with a plurality of transformers of differing turns ratio between the pick-up and one or more amplifier and loud speaker systems, so that signals derived from one group of coils can be applied to one amplifier and loud speaker system through any one or combination of transformers, whilst signals derived from the other group of coils can be applied to the same or another amplifier and loud speaker system through the same one or combination or any other one or combination of the transformers, or alternatively the signals derived from the two groups of coils can be applied to one or more amplifier and loud speaker systems through the same one or combination of transformers. Preferably the switching means also provides for one or other or neither of the groups of coils to be short-circuited when the two groups of coils are connected in series between the common pair of output leads. In the same manner it is possible to provide for different tonal qualities of sound to be reproduced from a single pick-up in a single guitar, since the signals derived from one group of coils can be treated differently from those derived from the other group of coils. By using two amplifier and loud speaker systems a form of stereophonic effect can be obtained by feeding signals derived from the same or different groups of coils to each amplifier through different transformers or combinations of transformers.

It is not essential for the permanent magnet or permanent magnets and the pole pieces or core members to be separate and the pole pieces themselves may be in the form of permanent magnets. Moreover it is possible to effect some economy and simplification of construction by disposing each low impedance coil around two, three or more pole pieces. It is also envisaged that a single bar magnet may serve not only as the permanent magnet for the core structure, but also as all the pole pieces; such bar magnet has a length sufficient to extend beneath all the strings from whose vibrations signals are desired to be derived and a single low impedance coil is disposed therearound, the bar magnet having its magnetic axis substantially parallel to the axis of the coil. The bar magnet may comprise two bar magnets placed end to end or spaced slightly from one another and both with their magnetic axes in the same sense and substantially parallel to the axis of the coil. It is also envisaged that where two bar magnets are used, two low impedance coils can be provided, one around each bar magnet and the combined bar magnets and coils may be in a staggered relationship, echelon fashion, in order to facilitate manufacture.

The permanent magnets may be in the form of small bar magnets circular in cross section and disposed either in a single group substantially in line with one another and with their physical and magnetic axes parallel to one another, or may be arranged in a plurality of groups, for example two groups of three, or two groups of two, or three groups of two, with a low impedance coil disposed around all of them when they are in a line, or with an individual low impedance coil arranged around each group. It is also envisaged that more than one low impedance coil may be provided around a pole piece, both when the pole pieces are separate from the permanent magnets and when the pole pieces are themselves permanent magnets. Thus, for example, where the pole pieces are permanent magnets and are arranged all in a single line, it would be possible to provide one low impedance coil around all the pole pieces and, for example, an additional low impedance coil around one group of three and another coil around another group of three.

The invention will be further described by way of example with reference to the accompanying drawing.

Figure 1:
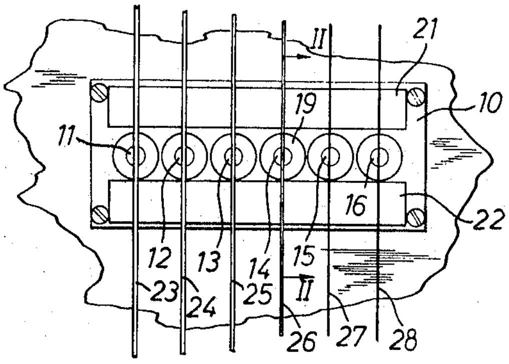
FIG. 1 is a plan view of a pick-up embodying the present invention.
Figure 2:
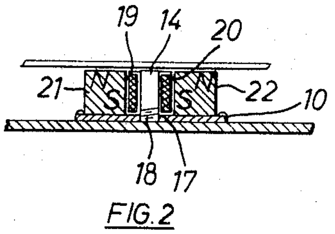
FIG. 2 is a section along the line II—II of FIG. 1.

Referring initially to FIGS. 1 and 2, a pick-up embodying the present invention comprises a base plate 10 having upstanding therefrom a plurality of cores 11, 12, 13, 14, 15, 16. In the example illustrated, which is intended for use with a conventional guitar having six strings, six cores are provided, but it will be understood that if the number of strings is greater or less than six, a corresponding number of cores will be provided. The base 10 is drilled and tapped as at 17 and one end of each core is screw-threaded as at 18 to enable the height of the end of each core above the base 10 to be adjusted as required. Surrounding each core is a bobbin such as 19 containing a coil such as 20. Also upstanding from the base 10 are a pair of permanent magnets 21, 22. The magnets are arranged substantially parallel to the centre line of the cores 11, 12, 13, 14, 15, 16, and are arranged with their magnetic axes substantially parallel to the axes of the cores and in the same sense. The cores are spaced from one another along the base 10 corresponding to the spacing between the strings in a guitar, which strings are illustrated diagrammatically by way of example at 23, 24, 25, 26, 27, 28, in FIG. 1.

Each of the coils 20 has a D.C. resistance preferably not greater than about 1 ohm and each coil may have from 300 to 500 turns of wire of about 34 to 38 SWG. Each of the permanent magnets 21, 22 is preferably magnetized at high intensity and may conveniently be a ferrite ceramic material. The base plate 10 may be of mild steel sheet and each of the cores, such as 14, can also be of mild steel.

Figure 3:
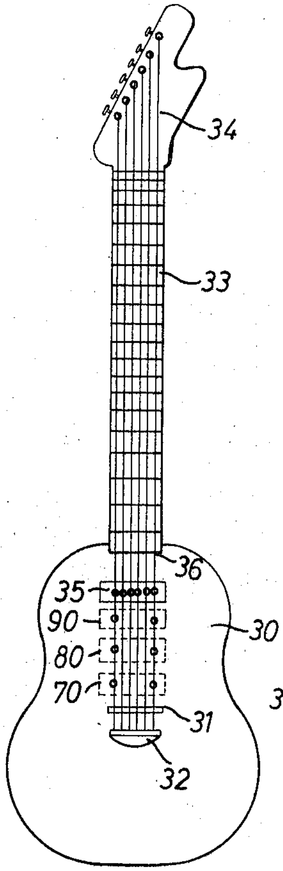
FIG. 3 illustrates diagrammatically a guitar provided with one or more pick-ups.
Figure 4:
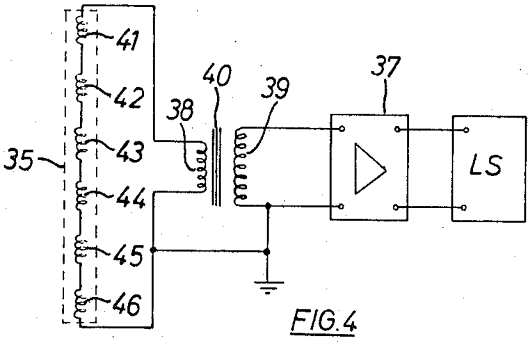
FIG. 4 is a circuit diagram showing a pick-up, coupling transformer and amplifier and loud speaker system.

Referring now to FIG. 3, a conventional guitar includes a body 30 having a bridge 31 and a tail piece 32, and a neck having a finger board 33 and a machine head 34. A pick-up 35 may be mounted in the space between the end 36 of the finger board and the bridge 31. When a single pick-up is provided it is convenient to mount it nearer the end of the finger board. One circuit arrangement for coupling a pick-up 35 to an amplifier and loud speaker system indicated generally at 37 is illustrated in FIG. 4. The pick-up 35 has six coils designated 41, 42, 43, 44, 45, 46, the coil 43 corresponding to the coil 20 in FIG. 2, which are connected in series with one another to primary winding 38 of a coupling transformer 40 whose secondary winding 39 is connected to the input circuit of the amplifier 37. The turns ratio of the transformer 40 may conveniently be such as to match the impedance of the coils of the pick-up 35 to the input impedance of the amplifier.

Figure 5:
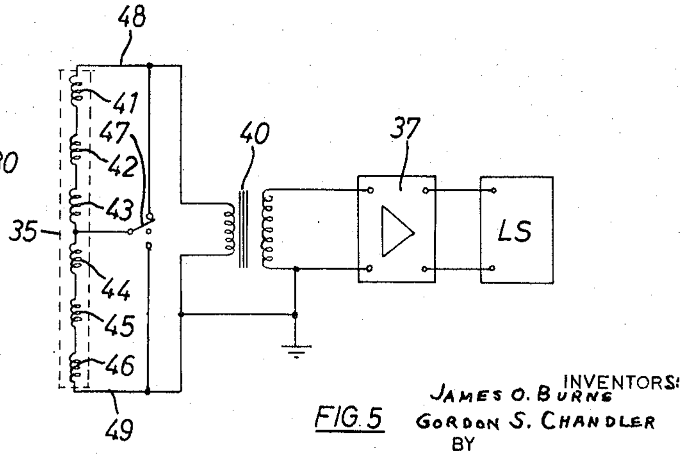
FIG. 5 illustrates a modification of the circuit diagram of FIG. 4.

If it is desired to render one or more of the coils in a pick-up ineffective, this may conveniently be done by short-circuiting a coil or group of coils. A convenient method of rendering either of two groups of three coils ineffective is illustrated in the circuit diagram of FIG. 5 in which a single pole three-position switch 47 is provided having its moving contact connected to the common point between coils 43 and 44, one fixed contact connected to a lead 48 from coil 41, another fixed contact disconnected and a third fixed contact connected to a lead 49 from coil 46. With the moving contact in the upper position as shown in FIG. 5, coils 41, 42 and 43 are short-circuited and only those signals originating in coils 44, 45, 46, are passed through the transformer 40 to the amplifier and loud-speaker system 37. Similarly with the moving contact of switch 47 in its lower position, as shown in FIG. 5, coils 44, 45 and 46 are short-circuited and only those signals originating in coils 41, 42 and 43 are passed to the amplifier and loud speaker. With the moving contact in its middle position, as shown in FIG. 5, all six coils are effective.

The overall frequency response between the pick-up 35 and the amplifier and loud speaker system 37 can be varied by using a coupling transformer having a turns ratio other than that required to match the impedance of the pick-up 35 to the input impedance of the amplifier, or by using a coupling transformer having different impedance characteristics. A measure of tone control can conveniently be provided by providing a number of coupling transformers and switching means for selecting one or more of such transformers. In a preferred arrangement each of the coupling transformers has substantially the same physical dimensions; thus for example each may lie within a one-inch cube. Preferably each of the transformers has substantially the same core assembly and substantially the same dimensioned bobbin, the gauges of wire used for the primary and secondary windings being selected according to the turns ration required.

Figures 6, 7:
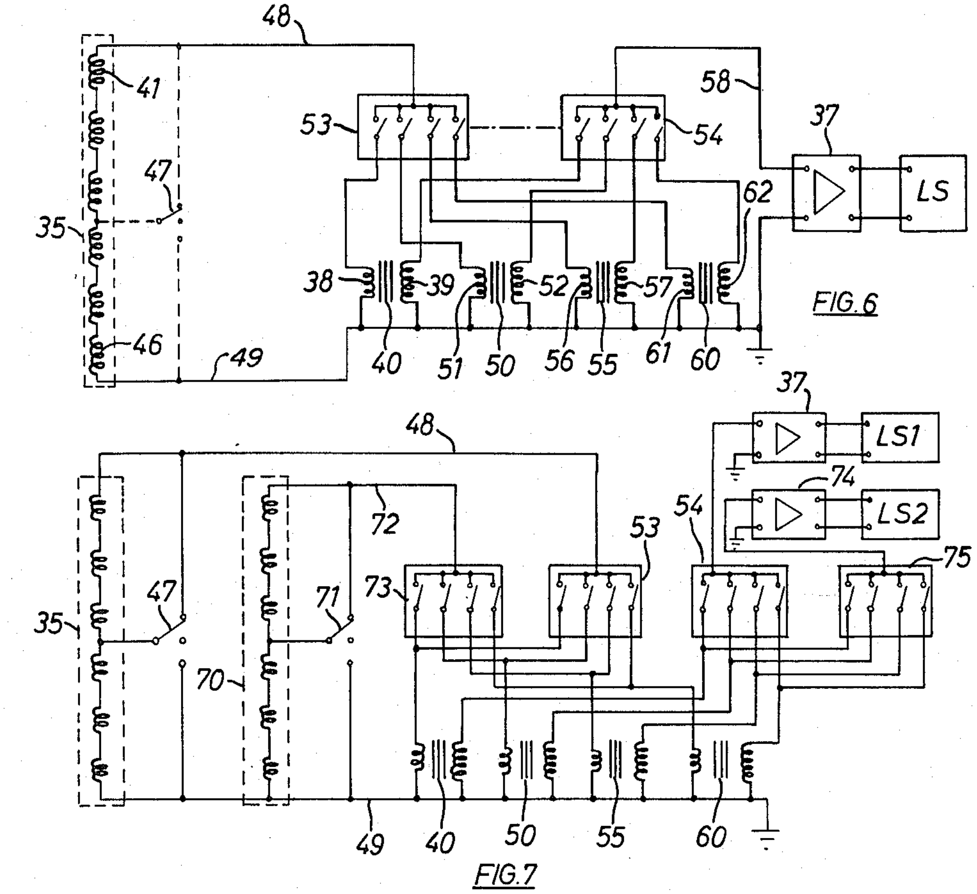
FIG. 6 is a circuit diagram of a coupling circuit including a plurality of coupling transformers.
FIG. 7 is a circuit diagram showing two pick-up units, a switching network, a plurality of coupling transformers, and two amplifier and loud speaker systems.

One form of coupling circuit embodying a plurality of coupling transformers is illustrated in FIG. 6. By way of example only, four coupling transformers 40, 50, 55, 60 are included and other numbers of transformers may be provided as desired. One end of each primary winding 38, 51, 56, 61 and one end of each of secondary windings 39, 52, 57, 62 of the transformers 40, 50, 55, 60 respectively, are connected to a common ground line 49 leading to one end of coil 46 in the pick-up 35. Lead 48 from one end of coil 41 of the pick-up 35 is extended to a selector switch 53 by which it can be selectively connected to the other end of one or more of the primary windings 38, 51, 56, 61. A second selector switch 54 associated with the selector switch 53 enables the other end of one or more of the secondary windings 39, 52, 57, 62 to be connected to lead 58 leading to the input circuit of the amplifier and loud speaker system 37. The turns ratios in the transformers 40, 50, 55, 60 may vary considerably over a wide range, for example as great as 50:1. By way of example, with a pick-up 35 having six coils each having a D.C. resistance not greater than 1 ohm and an amplifier having an input impedance in the range of 1 megohm one of the transformers may have a turns ratio as low as 20:1 and another may have a turns ratio as high as 400:1, the other transformers having intermediate turns ratios.

Whilst the secondary windings of the transformers can be connected in series with one another, it is preferable for them to be connected in parallel. The additional selector switch 54 may be dispensed with, if desired, though it is provided primarily to enable the shunting effect of a transformer of low turns ratio to be avoided when, for example, only a transformer of high turns ratio is being used. The selector switches 53 and 54 are preferably coupled so as to ensure that lead 58 is connected to the secondary windings of any transformers whose primary windings are connected to lead 48. The selector switches may enable each transformer to be in circuit individually and also enable any group of two or three transformers to be in circuit or yet again enable all four transformers to be in circuit.

By placing one transformer of given turns ratio in circuit, so-called treble boost can be provided and this may be further emphasized by operating the switch 47 to short-circuit those coils associated with the bass strings on the guitar. Likewise by placing another transformer of different turns ratio in circuit, so-called bass boost may be imparted which likewise may be enhanced by operating the switch 47 to short-circuit the coils associated with the treble strings of a guitar.

The invention also envisages the provision of two or more pick-ups on a single guitar, one for example near the end 36 of the finger board, as illustrated at 35 in FIG. 3, and another adjacent the bridge 31 is indicated in broken lines at 70 in FIG. 3. Signals derived from either or both of the pick-ups can be fed to the amplifier loud speaker system 37 through a common group of transformers 40, 50, 55, 60 of differing turns ratios and characteristics, for example as illustrated in the circuit diagram of FIG. 7. The lead 48 from one end of the coils in the pick-up 35 is connectable to one end of the primary winding of one or more of the transformers through the selector switch 53 and in like manner lead 72 from one end of the coils of the pick-up 70 is connectable to one end of the primary winding of one or more of the transformers through selector switch 73. The secondary windings of the transformers 40, 50, 55, 60, may be connected in parallel and connected to the amplifier and loud speaker system 37, direct, but preferably a selector switch 54 is included for the same purpose as that described in connection with the circuit of FIG. 6.

Preferably a single pole three-position switch 71 is associated with the pick-up 70 in like manner to the switch 47 associated with the pick-up 35. A stereophonic effect can be produced by providing a second amplifier and loud speaker system 74, the input to the amplifier of which can be connected to the secondary winding of one or more of the transformers 40, 50, 55, 60 through a selector switch 75. By operating the switches 47 and 71 to render, for example, the coils associated with the treble strings ineffective in the pick-up 35 and the coils associated with the bass strings ineffective in the pick-up 70, and appropriately operating the selector switches 73, 53, and 54, 75, signals originating from the pick-up 35 can be fed to one amplifier loud speaker system and thus emanating from the other pick-up 70 fed to the other amplifier and loud speaker system.

Figure 8:
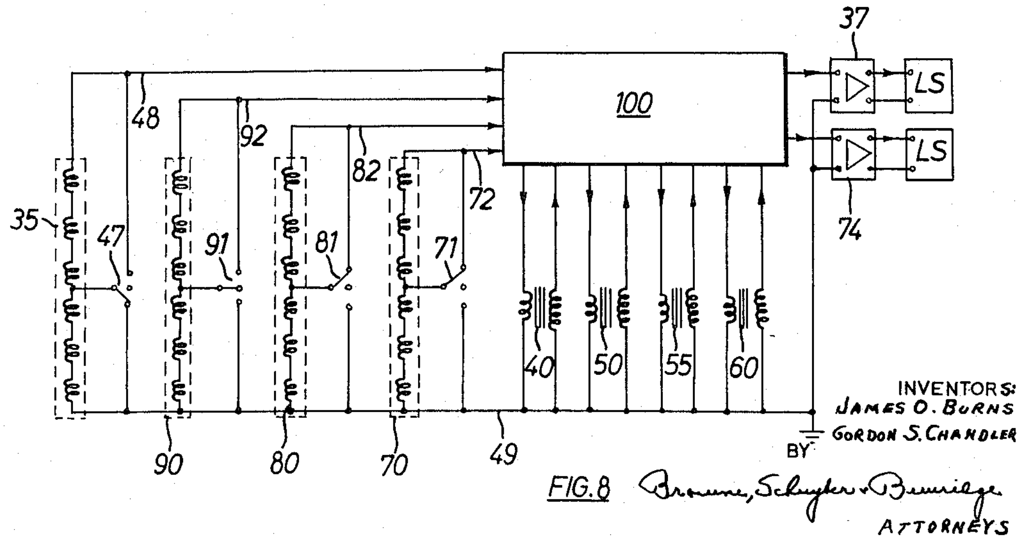
FIG. 8 is a block circuit diagram showing four pick-up units, a coupling circuit and two amplifier and loud speaker systems.

The invention also envisages the provision of a greater number of pick-ups on a single guitar. The total number of pick-ups which may conveniently be fitted is largely determined by the physical dimensions of the pick-ups and the physical dimensions of the guitar. Four pick-ups may conveniently be fitted as indicated diagrammatically at 35, 70, 80, 90 in FIG. 3. All the pick-ups so fitted can be coupled to one or more amplifier and loud speaker systems through a switching network and a common group of coupling transformers of differing turns ratio and/or impedance characteristics and preferably of the same physical size. One such arrangement is illustrated diagrammatically in the circuit diagram of FIG. 8. One side of each of the pick-ups 35, 90, 80, 70 is connected to the common ground line 49 and signals from the pick-up units are extended by leads 48, 92, 82, 72, to a switching network 100, enabling the leads 72, 82, 92 and 48 to be extended selectively each to one end of the primary winding of one or more of the transformers 40, 50, 55, 60. Switching network 100 also enables each one end of the secondary windings of the transformers 40, 50, 55, 60 to be extended to the inputs of either or both of the amplifier and loud speaker systems 37 and 74. The switching network 100, in conjunction with single-pole multi-position switches 47, 91, 81, 71 for selectively short-circuiting groups of coils in each of the pick-ups enables a wide range of differing tonal characteristics as well as stereophonic effects to be obtained from a single guitar as a result of the differing frequency response obtainable between each pick-up and an amplifier and loud speaker system and as a result of the differing harmonic content of the vibrations of the strings and at different positions along their length.

Whilst a wide variety of conditions can be established by the switching network 100, the invention envisages selecting a relatively small number of such possible combinations, for example, 8 or 10, and making each of such combinations available selectively by means of a multi-position push-button switch unit which may be conveniently of small dimensions, such as to be accommodated on the guitar itself for ease of operation by a player. Moreover the coupling transformers 40, 50, 55, 60 may be of sufficiently small size to enable them also to be accommodated on the guitar with the attendant avoidance of multiple trailing cables between the guitar and the amplifier and loudspeaker systems.

When only a single pick-up is provided on a guitar it is possible to treat signals derived from one group of strings differently from those derived from the other group of strings if the coils are separated into two groups, those in each group being connected, preferably in series with one another, between a pair of output leads individual to that group. One such arrangement is illustrated in the circuit diagram of FIG. 9. The coils 41, 42 and 43 are connected in series with one another between output leads 48 and 103 and form one group 101 whilst the other coils 44, 45 and 46 are connected in series with one another and form a second group 102 between output leads 49 and 104. Lead 48 connects with the selector switch 53 by which it can be connected to any one or more of the primary windings of the transformers 40, 50, 55, 60. The leads 103, 104 are extended to the moving contacts of a double-pole four-position switch, the two parts of which are indicated at **47*a*, 47*b*. With the moving contacts of the switch in the positions illustrated in FIG. 9 lead 103 is connected to ground and lead 104 is connected to lead 105 so that the signals derived from coils in the first group 101 appear between ground and lead 48 and those derived from coils in the second group 102 between ground and lead 105. Lead 105 is extended to an additional selector switch 53*a* by which it can be connected to any one or more of the primary windings of the transformers 40, 50, 55, 60. The second selector switch 54 enables the secondary windings of one or more of the transformers to be extended to lead 58 leading to the input circuit of the amplifier and loud speaker system 37. A second additional selector switch 54*a* can be provided for extending the secondary windings of one or more of the transformers to lead 58*a* if a second amplifier and loud speaker system 37*a*** is provided so that a form of stereophonic sound can be produced by feeding signals from one group of coils to one amplifier and loud speaker system through one or more of the transformers and feeding signals from the other group of coils to the other amplifier and loud speaker system through one or more other transformers.

With the moving contacts of the switch parts **47*a*, 47*b* in any of their other three positions lead 103 is connected to lead 104, and lead 105 is disconnected so that coils in the two groups 101, 102 are connected in series with one another and the signals derived from the coils appear between ground and lead 48; these three other positions of the moving contacts provide for either of the coils in group 101, or the coils in neither group, or the coils in group 102 to be short-circuited in a manner similar to that effected by the switch 47 as hereinbefore described in the circuit diagram of FIG. 5, 6, 7 or 8. Selector switch 53*a* is then ineffective, but selector switch 53 enables the signals derived from the coils of the pick-up to be applied to any desired one or combination of the transformers, and selector switch 54 enables the secondary windings of the appropriate transformers to be extended to the amplifier and loud speaker system 37. If the second amplifier and loud speaker system 37*a* is provided together with the selector switch 54*a*** signals from selected one or more of the transformers can be extended to one amplifier and loud speaker system whilst signals from the same or any other one or more of the transformers can be extended to the other, and enable a stereophonic effect to be obtained.

Figure 9:
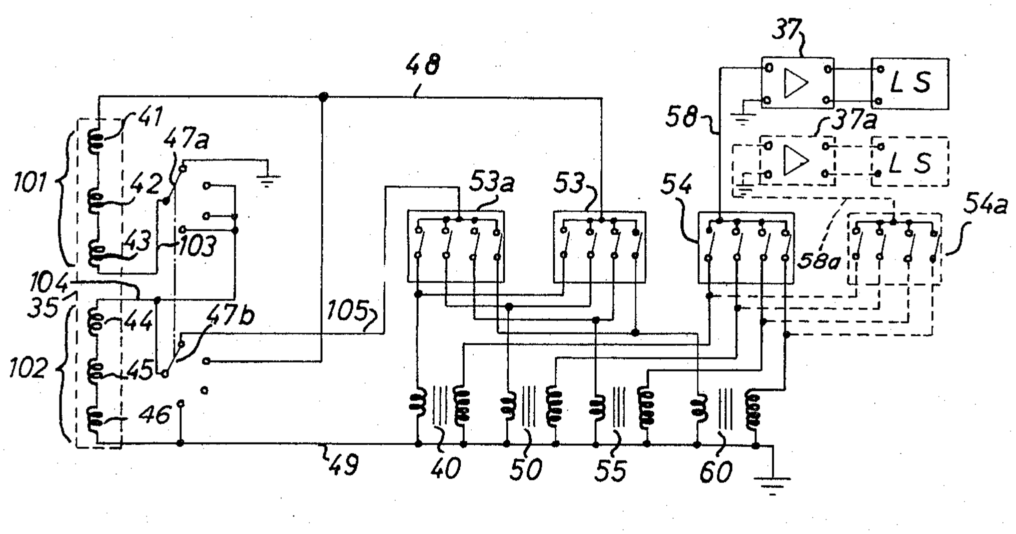
FIG. 9 is a circuit diagram showing a modification of the circuit diagram of FIG. 6.

When only a single output is being delivered between ground and lead 48 and it is only desired to utilize signals derived from one group of coils, the other group of coils can be rendered ineffective by disconnecting rather than by short-circuiting them and it will be apparent to one skilled in the art that the connections to the fixed contacts of switch part **47*a* can be modified by leaving the top contact connected to ground, as shown in FIG. 9, the second contact disconnected, the third contact connected to the third contact of the switch part 47*b* and the bottom contact connected to ground, and the connection of the fixed contacts of switch part 47*b* can be modified by leaving the top contact connected to lead 105 and the second contact connected to lead 48 as shown in FIG. 9, the third contact connected to the third contact of the switch part 47*a***, and the bottom contact disconnected, in order to achieve the same effective results.

It is not essential for the pole pieces or core members to be separate from the permanent magnet or permanent magnets and it is also envisaged that the permanent magnet may also serve as pole piece and the low impedance coil or coils be disposed therearound. Similarly it is not essential for each pole piece to have a coil individual thereto and it is possible for the coils to embrace more than one pole piece.

Figure 10:
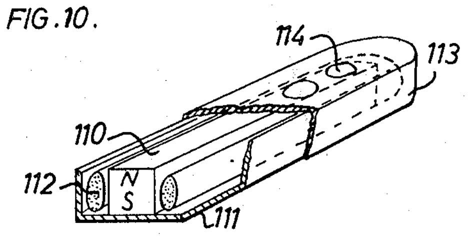
FIG. 10 is a part sectional perspective view of another pick-up embodying the present invention.

One form of pick-up embodying a single coil and a permanent magnet acting also as pole piece is illustrated in FIG. 10. A bar magnet 110 is mounted substantially centrally on a generally U-shaped base plate 111 preferably of magnetic material so that the magnet will be attached thereto by magnetic attraction. The bar magnet has its magnetic axis extending generally away from the base plate and is surrounded by a single low impedance coil 112. The magnet and coil are a relatively tight fit between the sides of the base plate 111 and are enclosed by a cover 113 which may conveniently be of brass. The cover may be provided with a series of apertures 114, one for each string from whose vibrations signals are to be derived and the apertures may be closed by a strip of plastic sheet material lying above the magnet 110.

Figure 11:
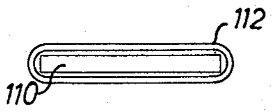
FIG. 11 is a diagrammatic plan view of the embodiment of FIG. 10 with certain parts removed.
Figure 12:
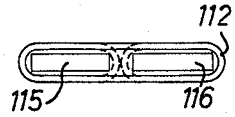
FIGS. 12 and 13 are diagrammatic plan views of modifications of the embodiment of FIG. 10.
Figure 13:
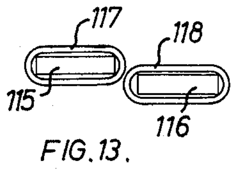

This embodiment is illustrated diagrammatically in plan view in FIG. 11 with the cover and base plate omitted. It is not essential for the magnet 110 to be in a single piece and it may be formed of two bar magnets 115, 116, as illustrated diagrammatically in FIG. 12. Where two bar magnets are used, they may be in line with one another and surrounded by a single low impedance coil or may each be surrounded by an individual low impedance coil and, for convenience of manufacture, the two bar magnets may be offset from one another, echelon fashion, as illustrated in FIG. 13, and each surrounded by an individual low impedance coil 117, 118 respectively.

Figure 14:
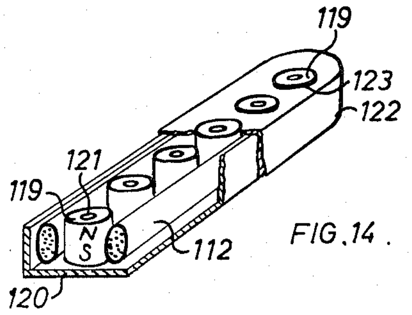
FIG. 14 is a part sectional perspective view of a still further pick-up embodying the present invention of FIGS. 15, 16 and 17 and diagrammatic plan views with certain parts removed of modifications of the embodiment illustrated in FIG. 14.
Figure 15:
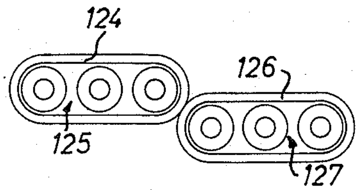
Figure 16:
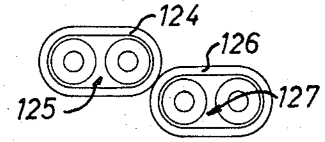

Permanent magnets may be in the form of a plurality of round magnets, each serving as individual pole piece. One form of pick-up embodying round magnets is illustrated in FIG. 14 and comprises a plurality of bar magnets 119, each secured to a generally U-shaped base plate 120 by a rivet 121. All the magnets 119 are surrounded by the low impedance coil 112 and the coil is a relatively tight fit between the sides of the base plate 120 which is closed by a cover 122 which is itself a tight fit over the sides of the base plate. The cover is apertured as at 123 to permit the magnets 119 to protrude slightly above it. As in the case of the embodiments illustrated in FIGS. 10 to 13, it is not essential that a single coil should encircle all the magnets, and two or more coils can be provided, each encircling a group of magnets. For example in the embodiment illustrated diagrammatically in the plan view of FIG. 15, one coil 124 may encircle a first group 125 of magnets and a second coil 126 can encircle a second group 127 of magnets, the two groups of magnets being offset from one another in echelon fashion, if desired, though they may also be in a single straight line as illustrated in FIG. 14. The embodiment illustrated in FIG. 16 has only four magnets and thus is suitable for a bass guitar having only four strings, though it will be understood that a single coil encircling all the magnets can be used.

Figure 17:
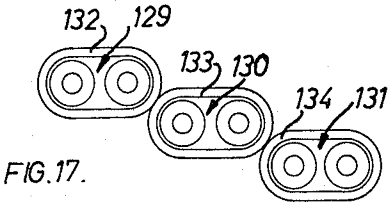

In a still further modification illustrated diagrammatically in the plan view of FIG. 17, six magnets are divided into three groups 129, 130, 131, each of two magnets and disposed offset from one another, echelon fashion. Three separate coils 132, 133, 134 encircle the magnets in the groups 129, 130, 131 respectively.

In any of the embodiments illustrated in FIGS. 11 to 17 it is not essential for the coils to be wound on bobbins and they can satisfactorily be constructed either by winding them of enamel copper wire and shaping them on a former and then coating them with a lacquer, such as shellac. Yet again they may be wound from a copper wire coated with a thermoplastic insulating coating and, after shaping on a former, may be heated either by passing a sufficiently strong current through the coils or by the application of heat externally, such as in an oven to bond the turns of the coils, one to another.

Where a coil encircles more than one magnet or pole piece, it may have a slightly higher D.C. resistance with the figure of about 1 ohm referred to above for coils encircling single pole pieces. A coil encircling all the pole pieces may have a D.C. resistance up to about 24 ohms, one encircling three magnets, or pole pieces up to about 12 ohms and one encircling two magnets or pole pieces up to about 6 ohms.

We claim:

1. A pick-up for a guitar comprising a magnetic core structure, a permanent magnet in said core structure, a plurality of pole pieces in said core structure equal in number to the number of guitar strings from whose vibration electric signals are desired to be derived, and a plurality of low impedance coils having a D.C. resistance not greater than about 1 ohm disposed one around each pole piece.

2. A pick-up for a multi-stringed guitar comprising a magnetic core structure, at least one permanent magnet in said core structure, and, for each guitar string from the vibration of which signals are desired to be derived, a core member individual thereto in said core structure, and a low impedance coil having a D.C. resistance not greater than about 1 ohm around each core member.

3. A pick-up for a multi-stringed guitar, comprising a magnetic core structure, at least one permanent magnet in said core structure, and a plurality of spaced substantially parallel and substantially co-extensive core members equal in number to the number of strings in the guitar, each core member having a low impedance coil having a D.C. resistance not greater than about 1 ohm disposed therearound.

4. A pick-up for a multi-stringed guitar, comprising a magnetic core structure, a base-plate in said core structure, a plurality of spaced substantially co-extensive core members extending from said base plate with their magnetic axes substantially co-planar, and at least one permanent magnet in said core structure and disposed on said base plate and substantially co-extensive with said core members and with its magnetic axis substantially parallel to the plane of the magnetic axes of the core members, each core member having a low impedance coil having a D.C. resistance not greater than about 1 ohm disposed therearound.

5. A pick-up for a multi-stringed guitar, comprising a magnetic core structure, a base-plate in said core structure, a plurality of spaced substantially co-extensive core members extending from said base plate with their magnetic axes substantially co-planar, and at least one permanent magnet in each core structure and disposed on said base plate and substantially co-extensive with said core members and with its magnetic axis substantially parallel to the plane of the magnetic axes of the core members, said core structure including a plurality of air gaps defined by that face of a permanent magnet which is remote from the base plate and those faces of said core members which are remote from the base plate, and each core member having a low impedance coil having a D.C. resistance not greater than about 1 ohm disposed therearound.

6. A pick-up for a multi-stringed guitar, comprising a base plate of magnetic material, a plurality of pole pieces, means for adjustably mounting said pole pieces at spaced localities on said base plate with their axes substantially parallel to one another such that the distance between the base plate and the end surface of each pole piece remote from the base plate is adjustable, a low impedance coil having a D.C. resistance not greater than about 1 ohm disposed around each pole piece, and a permanent magnet on said base plate substantially co-extensive with said pole pieces and substantially parallel to said pole pieces and with its magnetic axis substantially parallel to the axes of the pole pieces, the surface of the magnet remote from the base plate and the end surfaces of the pole pieces remote from the base plate defining in part air gaps within which the strings of a guitar can be received when the pick-up is mounted in a multi-stringed guitar.

7. A pick-up for a multi-stringed guitar, comprising a magnetic core structure, a base plate in said core structure, a plurality of spaced substantially co-extensive core members extending from said base plate with their magnetic axes substantially co-planar, a pair of permanent magnets in said core structure and disposed on said base plate one on each side of said core members and substantially co-extensive with said core members and with their magnetic axes substantially parallel to the plane of the magnetic axes of the core members and in the same sense, and a low impedance coil having a D.C. resistance not greater than about 1 ohm disposed around each core member.

8. A pick-up for a multi-stringed guitar, comprising a magnetic core structure, a base plate in said core structure, a plurality of spaced substantially co-extensive core members extending from said base plate with their magnetic axes substantially co-planar, a pair of permanent magnets in said core structure and disposed on said base plate one on each side of said core members and substantially co-extensive with said core members and with their magnetic axes substantially parallel to the plane of the magnetic axes of the core members and in the same sense, said core structure including a plurality of air gaps defined by those faces of the permanent magnets which are remote from the base plate and those faces of said core members which are remote from the base plate, and a low impedance coil having a D.C. resistance not greater than about 1 ohm disposed around each core member.

9. A pick-up for a multi-stringed guitar, comprising a base plate of magnetic material, a plurality of pole pieces, means for adjustably mounting said pole pieces at spaced localities on said base plate with their axes substantially parallel to one another such that the distance between the base plate and the end surface of each pole piece remote from the base plate is adjustable, a low impedance coil having a D.C. resistance not greater than about 1 ohm disposed around each pole piece, and a pair of permanent magnets on said base plate substantially co-extensive with said pole pieces disposed one on either side of said pole pieces and each extending substantially parallel to said pole pieces and both with their magnetic axes substantially parallel to the axes of the pole pieces and in the same sense, the surfaces of the magnets remote from the base plate and the end surfaces of the pole pieces remote from the base plate defining in part air gaps within which the strings of a guitar can be received when the pick-up is mounted in a multi-stringed guitar.

10. A pick-up according to claim 9 in which each pole piece is substantially circular in cross-section.

11. A pick-up according to claim 9 in which the base plate is provided with a plurality of spaced co-linear tapped bores and each pole piece is substantially circular in cross-section and is threaded at one end thereof for adjustable reception in one of said tapped bores in said base plate.

12. A pick-up according to claim 11 in which each coil is wound on a bobbin and each bobbin is secured to said base plate so as to lie around a pole piece.

13. A pick-up for a multi-stringed guitar, comprising a magnetic core structure, at least one permanent magnet in said core structure, and a plurality of spaced substantially parallel and substantially co-extensive core members equal in number to the number of strings in the guitar, each core member having a low impedance coil having a D.C. resistance not greater than 1 ohm disposed therearound.

14. A pick-up for a multi-stringed guitar, comprising a magnetic core structure including at least one permanent magnet, a plurality of core members equal in number to the number of guitar strings from whose vibrations signals are to be derived, a plurality of low impedance coils disposed one around each core member, each coil having a D.C. resistance not greater than about 1 ohm and means for connecting all of said coils electrically in series with one another.

15. A pick-up for a multi-stringed guitar, comprising a magnetic core structure including at least one permanent magnet, a plurality of core members equal in number to the number of guitar strings from whose vibrations signals are to be derived, a plurality of low impedance coils disposed one around each core member and arranged in a first group and a second group, each coil having a D.C. resistance not greater than about 1 ohm, means for connecting all the coils in the first group in series with one another between a first pair of leads and means for connecting all the coils in the second group in series with one another between a second pair of leads, and means for connecting all of said coils electrically in series with one another.

16. A pick-up for a multi-stringed guitar, comprising a magnetic core structure including at least one permanent magnet, a plurality of core members equal in number to the number of guitar strings from whose vibrations signals are to be derived, a plurality of low impedance coils disposed one around each core member and arranged in a first group and a second group, each coil having a D.C. resistance not greater than about 1 ohm, means for connecting all the coils in the first group in series with one another between a first output lead and a common connection, means for connecting all the coils in the second group in series with one another between a second output lead and said common connection, and switch means for selectively connecting said common connection to said first output lead to short circuit all the coils in said first group and connecting said common connection to said second output lead to short circuit all the coils in said second group and connecting said common connection to neither of said first and second output leads.

17. A pick-up according to claim 16 in which the number of coils in the first group is the same as the number of coils in the second group.

18. A pick-up for a multi-stringed guitar, comprising a magnetic core structure including at least one permanent magnet, a plurality of core members equal in number to the number of guitar strings from whose vibrations signals are to be derived, a plurality of low impedance coils disposed one around each core member, each coil having a D.C. resistance not greater than about 1 ohm, means for connecting all of said coils electrically in series with one another, a plurality of coupling transformers of differing characteristics, input leads for connection to an amplifier and loud-speaker system, and switching means for selectively connecting said coils to single and multiple selections of said transformers and for selectively connecting single and multiple selections of said transformers to said input leads.

19. A pick-up for a multi-stringed guitar, comprising a magnetic core structure including at least one permanent magnet, a plurality of core members equal in number to the number of guitar strings from whose vibrations signals are to be derived, a plurality of low impedance coils disposed one around each core member, each coil having a D.C. resistance not greater than about 1 ohm, means for connecting all of said coils electrically in series with one another, a plurality of coupling transformers each having a primary winding and a secondary winding, the primary and secondary windings of each transformer having a turns ratio differing from that of any other one of said transformers and all of said transformers having substantially the same physical size, input leads for connection to an amplifier and load-speaker system, and switching means for selectively connecting said coils to single and multiple selections of said transformers and for selectively connecting single and multiple selections of said transformers to said input leads.

20. A pick-up for a multi-stringed guitar, comprising a magnetic core structure including at least one permanent magnet, a plurality of core members equal in number to the number of guitar strings from whose vibrations signals are to be derived, a plurality of low impedance coils disposed one around each core member and arranged in a first group and a second group, each coil having a D.C. resistance not greater than about 1 ohm, means for connecting all the coils in the first group in series with one another between a first pair of leads and means for connecting all the coils in the second group in series with one another between a second pair of leads, and means for connecting all of said coils electrically in series with one another, switching means for selectively connecting one lead of said first pair to one lead of said second pair for connecting all the coils in said first and second groups in series with one another and for rendering all the coils in the first group ineffective and for rendering all the coils in the second group ineffective, a plurality of coupling transformers of differing characteristics, input leads for connection to an amplifier and loud-speaker system, and switching means for selectively connecting the first pair of leads and the second pair of leads to selected combinations of said transformers and for selectively connecting said input leads to selected combinations of said transformers.

21. A pick-up for a multi-stringed guitar, comprising a magnetic core structure including at least one permanent magnet, a plurality of core members equal in number to the number of guitar strings from whose vibrations signals are to be derived, a plurality of low impedance coils disposed one around each core member and arranged in a first group and a second group, each coil having a D.C. resistance not greater than about 1 ohm, means for connecting all the coils in the first group in series with one another between a first pair of leads and means for connecting all the coils in the second group in series with one another between a second pair of leads, and means for connecting all of said coils electrically in series with one another, switching means for selectively connecting one lead of said first pair to one lead of said second pair for connecting all the coils in said first and second groups in series with one another and for rendering all the coils in the first group ineffective and for rendering all the coils in the second group ineffective, a plurality of coupling transformers of differing characteristics, a pair of input leads each for connection to one of a pair of amplifier and loud-speaker systems, and switching means for selectively connecting the first pair of leads and the second pair of leads to selected combinations of said transformers and for selectively connecting said input leads to selected combinations of said transformers.

22. A pick-up system for a multi-stringed guitar comprising in combination a pair of pick-ups each comprising a magnetic core structure including at least one permanent magnet, a plurality of core members equal in number to the number of guitar strings from whose vibrations signals are to be derived, a plurality of low impedance coils disposed one around each core member, each coil having a D.C. resistance not greater than about 1 ohm, means for connecting all of said coils in a pick-up electrically in series with one another, and switch means for rendering a first group of said coils ineffective and all of said coils effective, and a second group of said coils ineffective; a plurality of coupling transformers of differing characteristics; first output leads for connection to a first amplifier and loud-speaker system; second output leads for connection to a second amplifier and loud-speaker system; and a switching network for selectively extending signals derived from each of said pick-ups to selected individual and combinations of said transformers and for selectively connecting individual and combinations of said transformers to said first and to said second input leads.

23. A pick-up system for a multi-stringed guitar comprising in combination a plurality of pick-ups each comprising a magnetic core structure including at least one permanent magnet, a plurality of core members equal in number to the number of guitar strings from whose vibrations signals are to be derived, a plurality of low impedance coils disposed one around each core member, each coil having a D.C. resistance not greater than about 1 ohm, means for connecting all of said coils in a pick-up electrically in series with one another, and switch means for rendering a first group of said coils ineffective and all of said coils effective and a second group of said coils ineffective; a plurality of coupling transformers of differing characteristics; first output leads for connection to a first amplifier and loud-speaker system; second output leads for connection to a second amplifier and loud-speaker system; and a switching network for selectively extending signals derived from each of said pick-ups to selected individual and combinations of said transformers and for selectively connecting individual and combinations of said transformers to said first and to said second input leads.

24. A pick-up for a multi-stringed guitar comprising a permanent magnet core structure, at least one permanent magnet in said core structure, a base plate, at least one pole piece in said core structure, and at least one low impedance coil having a D.C. resistance not greater than about 1 ohm around a said pole piece.

25. A pick-up for a multi-stringed guitar, comprising a base plate of generally U-shaped cross-section, at least one permanent magnet of bar shape disposed on said base plate with its magnetic axis extending substantially normally to said base plate, a low impedance coil having a D.C. resistance not greater than about 24 ohms disposed around said magnet with its axis substantially parallel to the magnetic axis of the magnet, and a close fitting cover overlying the sides of the base plate, the permanent magnet and the coil.

26. A pick-up for a multi-stringed guitar, comprising a base plate of generally U-shaped cross-section, a plurality of cylindrically shaped permanent magnets on said base plate, means for securing said magnets to said base plate, the magnetic axes of said magnets being parallel to one another and in the same sense, a low impedance coil having a D.C. resistance not greater than about 24 ohms disposed tightly in a space defined in part by sides of said base plate and by said magnets, a cover close fitting over the sides of said base plate and provided with apertures to receive said magnets and permit them to protrude therethrough, said cover and said base plate enclosing the coil.

27. A pick-up for a guitar, comprising a magnetic core structure including at least one permanent magnet and at least one pole piece, at least one low impedance coil surrounding at least one pole piece and having a D.C. resistance related to the number of pole pieces surrounded by it and not greater than about 24 ohms if six pole pieces are surrounded by it, and not greater than about 12 ohms if only three pole pieces are surrounded by it, and not greater than about 6 ohms if only two pole pieces are surrounded by it, and not greater than 1 ohm if only one pole piece is surrounded by it, a base plate having a base and sides in part defining a generally U-shaped cross-sectional core structure and coil receiving space, and a cover fitting closely over said base plate sides.

References Cited by the Examiner

UNITED STATES PATENTS

| | | | |
|---|---|---|---|
| 1,950,859 | 3/1934 | Midgley. | |
| 2,480,131 | 2/1950 | Hammond | 84—1.15 |
| 2,612,541 | 9/1952 | De Armond | 84—1.15 X |
| 2,683,388 | 7/1954 | Keller | 84—1.15 |
| 2,686,270 | 8/1954 | Ayers et al. | 84—1.15 X |
| 2,911,871 | 11/1959 | Schultz | 84—1.15 |
| 2,964,985 | 12/1960 | Webster | 84—1.15 |
| 3,035,472 | 5/1962 | Freeman | 84—1.15 X |
| 3,147,332 | 9/1964 | Fender | 84—1.15 |

ARTHUR GAUSS, *Primary Examiner.*

I. C. EDELL, *Assistant Examiner.*